United States Patent [19]

Niehenke

[11] Patent Number: 5,201,065
[45] Date of Patent: Apr. 6, 1993

[54] PLANAR MILLIMETER WAVE TWO AXIS MONOPULSE TRANSCEIVER WITH SWITCHABLE POLARIZATION

[75] Inventor: Edward C. Niehenke, Baltimore, Md.

[73] Assignee: Westinghouse Electric Corp., Pittsburgh, Pa.

[21] Appl. No.: 581,946

[22] Filed: Sep. 13, 1990

[51] Int. Cl.⁵ .................. H04B 1/40; H01Q 23/00
[52] U.S. Cl. .................. 455/83; 343/700 MS; 455/327
[58] Field of Search ........... 455/73, 327, 129, 269, 455/78-82; 343/700 MS

[56] References Cited

U.S. PATENT DOCUMENTS 4,742,354 5/1988 Wen et al. .................. 342/188

FOREIGN PATENT DOCUMENTS 0360692 3/1990 European Pat. Off.
0131612 6/1987 Japan.
0038308 2/1988 Japan.

OTHER PUBLICATIONS

"Microstrip Antennas", I. J. Bahl and P. Bhartia, Artech House, 1980, pp. 71-73.

Primary Examiner—Reinhard J. Eisenzopf
Assistant Examiner—Chi H. Pham
Attorney, Agent, or Firm—T. H. Martin

[57] ABSTRACT

Planar millimeter wave transceiver includes a plurality of patch antenna elements disposed on a substrate in right and left hand circular polarization. Microstrip feeds having an intermediate feed point, interconnect adjacent elements. First switches interconnect with the feed points of adjacent feeds and are alternately operable between first and second states for establishing azimuth and elevation. Second switches interconnected with the first switches are alternately operable between first and second states for establishing transmit and receive modes for the antenna and with phase compensation. The microstrip feeds, and the first and second switches are interconnected on the substrate without crossovers. Transmitter and receiver elements may also be incorporated onto the substrate to form an integrated transceiver.

27 Claims, 2 Drawing Sheets

PLANAR MILLIMETER WAVE TWO AXIS MONOPULSE TRANSCEIVER WITH SWITCHABLE POLARIZATION

RELATED APPLICATIONS

This application is related to a copending application entitled "Millimeter Wave And Infrared Sensor In A Common Receiving Aperture" in the name of Brusgard et al., Ser. No. 521,983 filed on May 11, 1990, assigned to Westinghouse Electric Corporation, the assignee herein.

BACKGROUND OF THE INVENTION

1. Field of the Invention

The invention relates to millimeter wave transceivers. In particular, the invention relates to a planar millimeter wave transceiver which has right and left hand circular polarization and is formed on a substrate without any crossovers.

2. Description of the Prior Art

Millimeter wave transceivers play an important role in many systems amplifications including radar and electronic countermeasures In the past, millimeter wave transceivers consisted of separate antenna feeds, a monopulse comparator, switches (e.g., switchable latching ferrites), mixers, IF amplifiers and transmitter elements. Most of the items are fabricated in waveguide or combination of waveguide and stripline components. The configurations are complex with many crossovers requiring costly multilayer waveguide interconnection arrangements. In the related application, for example, a compact and simplified antenna feed horn employing a comparator operates in left and right hand circularly polarized modes for establishing azimuth and elevation components. Nonetheless the arrangement is fairly complex and costly.

Monolithic circuits and transceivers have not been extensively used due to the difficulty of locating the circuit elements where they are needed without long line lengths, or crossovers, which add excess insertion loss. A need therefore exists for transceiver circuitry wherein the antenna, transmitter, and receiver can be integrated together in a low cost circuit.

SUMMARY OF THE INVENTION

A planar millimeter wave transceiver of the present invention includes a substrate and a plurality of antenna elements disposed on the substrate in right and left hand circular polarization. Microstrip feeds each having an intermediate feed point, interconnect adjacent elements. A first switch means is interconnected with the feed points of adjacent feeds in opposite pairs and is alternately operable between first and second states for establishing azimuth and elevation. A second switch means interconnected with the first switch means is alternately operable between first and second states for establishing transmit and receive modes for the antenna. The microstrip feeds, and the first and second switch means are interconnected on the substrate without crossovers and with phase compensation. Transmitter and receiver elements may also be incorporated onto the substrate to form an integrated transceiver.

DESCRIPTION OF THE INVENTION

Figure 1:
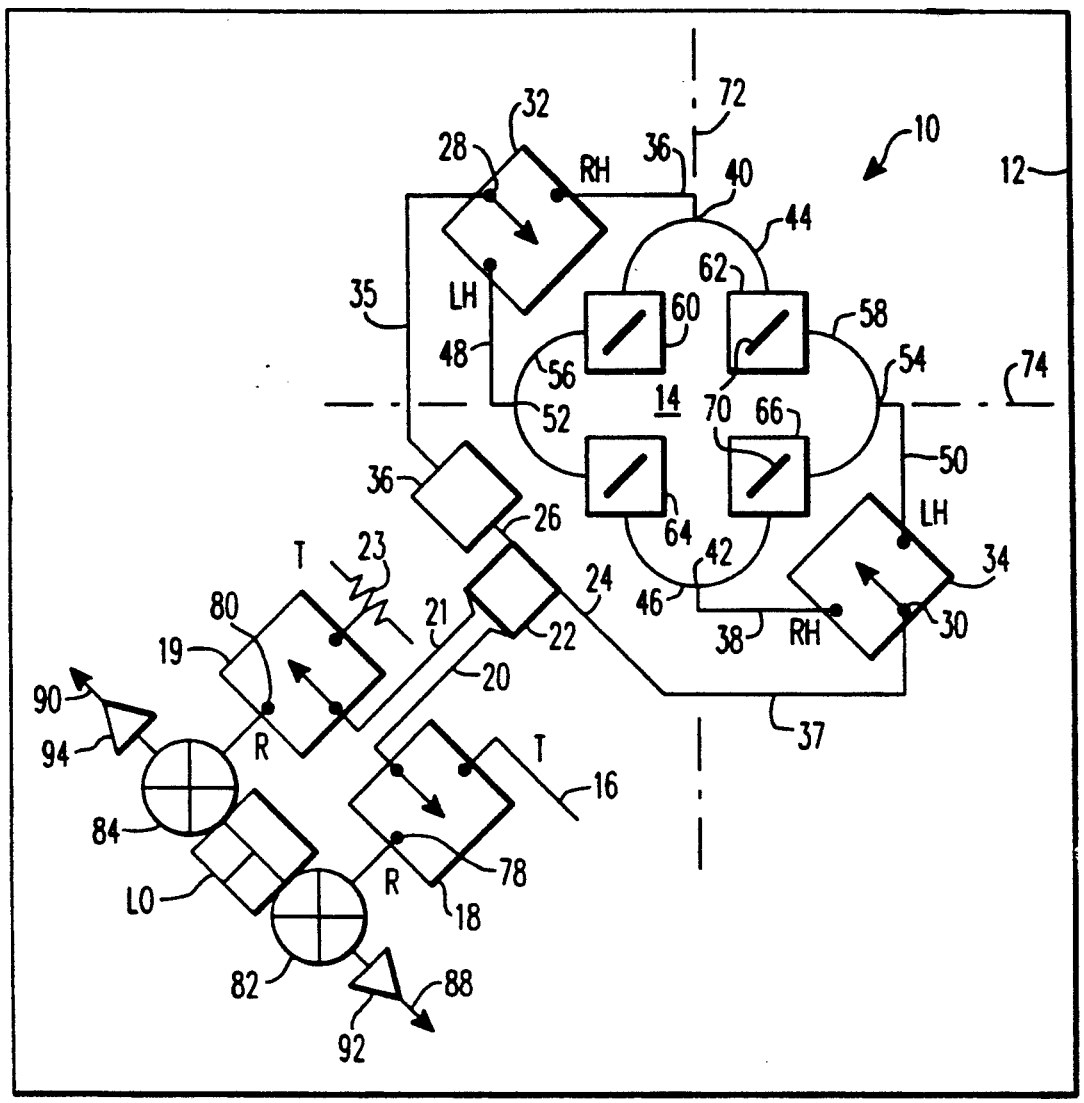
FIG. 1 is a schematic diagram of a millimeter wave transceiver of the present invention.

FIG. 1 illustrates schematically a millimeter wave transceiver 10 of the present invention which has no crossovers. The invention allows all functions to be integrated on a substrate 12 employing a single transmission medium such as microstrip lines. Monolithic circuit elements such as monolithic PIN diodes or FET switchers, mixers, IF amplifiers, as well as transmit functions can be used and combined on the substrate 12. In the arrangement illustrated a microstrip antenna 14 is co-located with circuit elements on the substrate 12 to thereby eliminate the need for transitions to waveguides and waveguide runs.

A transmit signal input 16 is coupled to the transmit (T) position of switch 18 which operates in Transmit (T)/Receive (R) modes. Switch 19 which operates in the Receive (R) mode cooperates with switch 18 as hereinafter described. The source (not shown) for the transmit signal may be a fundamental source such as a Gunn or Impatt diode source, or a lower frequency source which is multiplied up to the output frequency or any other previously amplified millimeter wave signal. The output from the switch 18 is directed to a line 20 and to a coupler 22 having an appropriate 3db characteristic and providing a $-90°$ phase shift for a portion of the signal at output 24 and $-180°$ phase shift at output 26. Leakage of the transmitted signal from coupler 22 is coupled over lead 21 to dummy load 23 via switch 19 in the transmit (T) position.

The coupler 22 is interconnected to respective input ports 28 and 30 of switches 32 and 34 by coupling transmission lines 35 and 37. The phase shifted output 26 of the coupler 22 is phase shifted an additional $-90°$ by phase shifter 36 located in the coupling transmission line 35 between the coupler 22 and the input port 28 of switch 32. Phase shift is accomplished by providing an increased length of line interconnecting the output 26 and port 28 equal to a quarter wavelength of the transmit signal at the center frequency. Thus, ports 28 and 30 receive signals of equal amplitude and 180° out of phase with respect to each other as a result of the various phase shifts afforded by the coupler 22 and the phase shifter 36.

The switches 32 and 34 can assume two states corresponding to respective right hand (RH) and left hand (LH) positions. When the switches 32 and 34 are both in the RH position, respective outputs 36 and 38 are connected to the right hand feed points 40 and 42 on antenna feeds 44 and 46. Similarly, when the switches 32 and 34 are in the left hand (LH) positions the outputs 48 and 50 are connected to the respective left hand feed points 52 and 54 on antenna feeds 56 and 58.

The antenna 14 is formed of four patch elements 60, 62, 64 and 66. Switch 32 in the right hand position couples signal in one direction (i.e. from the top) to the antenna elements 60 and 62 as a pair; and switch 34 in the right hand position couples signal in the opposite direction (i.e. from the bottom) to the antenna elements 64 and 66 as a pair. Similarly, when the switches 32 and 34 are shifted to the left hand position, antenna elements 60 and 64 are commonly fed as a pair from the left by switch 32 and antenna elements 62 and 66 are commonly fed in the opposite direction from the right as a pair by the switch 34.

When switches 32 and 34 are in the right hand position, the millimeter wave signals appearing at the inputs of paired elements 60–62 are equal amplitude but 180° out of phase with respect to the signals appearing at the paired antenna elements 64–66 due to the 180° phase shift imparted by coupler 22 and phase shifter 36. However, there is a difference at the feed points 40 and 42 in the direction of the feed to the antenna feeds 44–46 for paired elements 60–62 and 64–66 respectively, i.e., the signals are fed in opposite directions. Thus, there is a 180° phase reversal between the signals appearing at the respective elements. This 180° phase reversal plus the 180° phase difference between the signals at the respective inputs results in the radiation from antenna elements 60–62 and 64–66 being in phase. In other words the signal reversal and various phase shifts are phase compensated by the microstrip layout which avoids crossovers. The same result occurs when the antenna elements are fed by the switches 32 and 34 in the left hand position. Similarly, received signals are phase reversed and phase shifted to result in sum and difference signals on lines 20 and 21, respectively.

In the arrangement illustrated, the antenna elements 60, 62, 64 and 66 are formed of metallized films 68 each having a slot 70 formed therein by the removal of the metal. The antenna elements 60, 62, 64 and 66 radiate either in right hand or left hand circular polarization, the direction depending upon the location of the feed point with respect to the particular element. For example, when switches 32 and 34 are in the right hand position, the slot 70 in each antenna elements 60, 62, 64 and 66 is oriented 45° clockwise from an axis 72 connecting the feed points 40 and 42 as shown. Accordingly, then right hand circular polarization is produced. When the switches 32 and 34 are in the left hand position, slot 70 in each antenna element 60–66 is oriented 45° counterclockwise with respect to the axis 74 passing through the feed points 52 and 54. Accordingly, left hand circular polarization is produced. If the slots 70 are eliminated, antenna elements 60, 62, 64 and 66 connected in the right hand position produce vertical polarization and while in the left hand position produce horizontal polarization.

Figure 3:
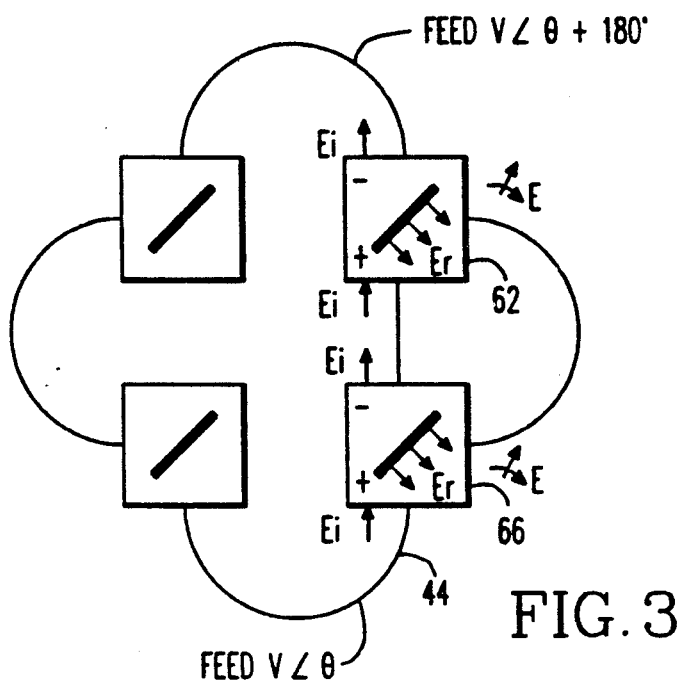
FIG. 3 is a detail of the antenna elements with input and radiating fields illustrated.

FIG. 3 illustrates graphically the composite field in antenna elements 62, 66 when fed by switches 32 and 34 in the RH position. (Antenna elements 60 and 64 have the same field and are thus not illustrated). The voltage $V\angle\theta$ feeding antenna element 66 results in various local electric fields $E_l$ and $E_r$ which radiate a composite right hand circularly polarized field E. The phase reversed voltage $V\angle\theta+180°$ feeding element 62 in the opposite direction, i.e., from the bottom, similarly radiates a composite right hand circularly polarized field E. When elements 62 and 66 are fed from top and bottom with a 180° phase difference they radiate fields that are equiphase with the same sense of circular polarization as shown by the crossed arrows E adjacent elements 62 and 66 in FIG. 3. If all elements were fed from the bottom or top or right or left, then the feed voltages should be equiphase for the same radiation from each antenna element. Since antenna element 66 is fed from the bottom, and antenna element 62 is fed from the top, the fields E from the elements are 180° out of phase. Equiphase feeds would cause a null at the center of the beam position which is undesired. This is why the 180° phase difference is imposed on the feed signals by coupler 22 and phase shifter 36 to negate the effect of the space reversal of the fields. This also allows for a microstrip layout without any crossovers. In the receive mode the fields carried by the antenna elements 60, 62, 64 and 66 are phase reversed in the circuitry to provide sum and difference signals.

Referring again to the arrangement illustrated in FIG. 1, each of the antenna elements 60, 62, 64 and 66 are fed from a side. Accordingly, there may be undesirable effects in the radiation due to the impedance presented to the antenna element by the open portion of the feed. When, for example, switches 32 and 34 are in the right hand position, antenna feeds 44 and 46 and adjacent pairs of antenna elements 60–62 and 64–66 are in circuit with the input ports 28 and 30, and the antenna feeds 56 and 58 are in open circuit relation with the ports 28 and 30. Selection of transmission line lengths between the corresponding switches 32 and 34 and each of the antenna elements 60–66 compensates any impedance mismatch. The line length between the open LH pole of the switch 32 and the left hand feed point 52 may be selected to be a quarter wavelength or odd multiples thereof of the signal. The line length may be adjusted if the open pole has a reactive component. Likewise, the distance from the feed point 52 along the antenna feed 56 to the respective antenna elements 60 and 64 are quarter wavelengths or odd multiples thereof. The line length of the feeds 44, 46, 56 and 58 from the respective antenna elements 60, 62, 64 and 66 to the various tie points 40, 42, 52 and 54 being a quarter wavelength or odd multiples thereof can act as transformers, thereby matching the antenna elements to the system. The open LH pole of the switch 32 thus is transformed into a short circuit at the feed point 52 between adjacent antenna elements 60 and 64 thereby isolating the adjacent elements even though they are physically connected by the antenna feed 56. The short circuit at the feed point 52 is transformed into an open circuit at each of the adjacent elements 60 and 64. Thus, when the switches 32 and 34 are in the right hand position elements 60–62 and 64–66 are fed from the top and bottom by respective antenna feeds 44 and 46 and the impedance looking from the antenna element (for example 60 looking into the left hand antenna feed 56) feeding the antenna element from the side looks like an open circuit. Accordingly, the antenna elements 60 and 64 are isolated from each other when the switch 32 is in the right hand position even though the elements are physically connected by the antenna feed 58. The same analysis holds for other open poles of the switches 32 and 34.

When the switches 18 and 19 are in the receive (R) position and the switches 28 and 30 are in the LH position the antenna 14 produces sum and difference Azimuth information in left hand polarization sense. When the switches 28 and 30 are in the RH position, the antenna 14 produces sum and delta elevation information in right hand polarization sense. In the R position the respective outputs 78 and 80 of the switches 18 and 19 are mixed in mixer elements 82 and 84 with a signal LO from the local oscillator (not shown in FIG. 1 but see FIG. 2) to produce respective intermediate frequency signals 88 and 90 after amplification in the amplifiers 92 and 94.

Figure 2:
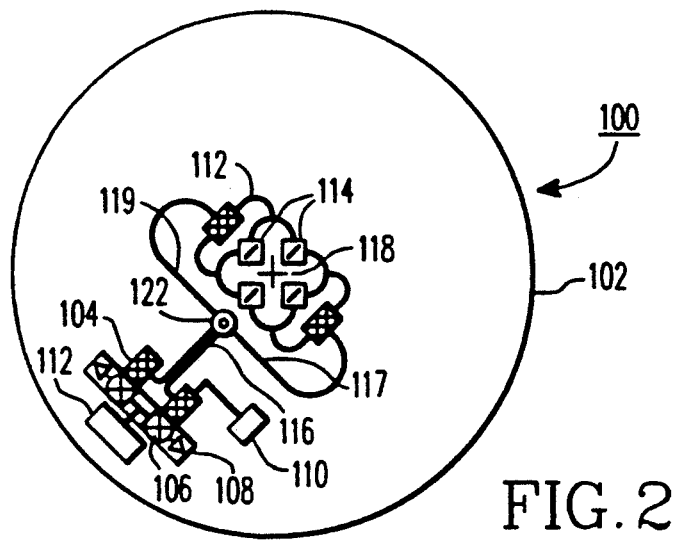
FIG. 2 is a layout for the millimeter wave transceiver on a circular substrate.
Figure 4B:
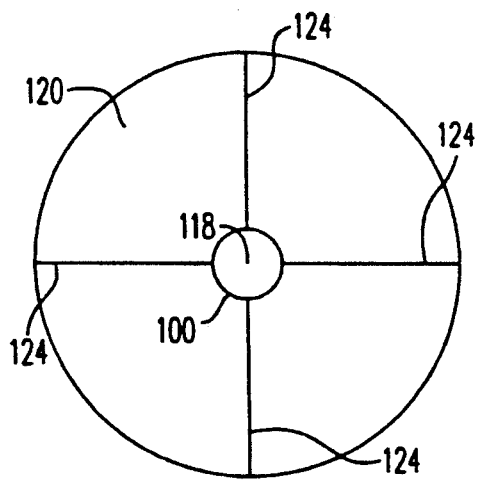
FIG. 4B is a side schematic illustration of FIG. 4A viewed from the transceiver to the reflector.
Figure 4A:
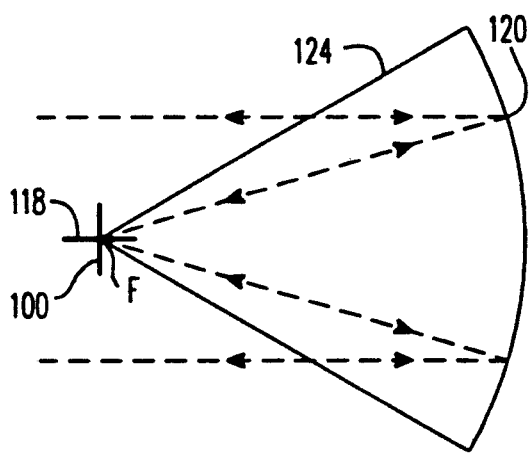
FIG. 4A is a schematic illustration of the planar millimeter wave transceiver of FIG. 2 supported in a parabolic reflector.

FIG. 2 illustrates a layout for 94 GHz transceiver 100 on a low loss microstrip substrate 102 such as quartz. Switches 104, mixers 106, amplifiers 108 and optional transmitter 110 and local oscillator 112 may be laid out in GaAs MMIC elements. Antenna elements 114 and the microstriplines 116 are metallized films formed on the substrate 102. In the preferred arrangement the antenna elements 114 are a 2×2 array located close to the center 118 of the substrate 102. Spacing between adjacent antenna elements 114 may be adjusted for the desired antenna pattern. Also, the annular microstrip coupler 122 imparts a first 90° phase difference relationship in the signals in the respective right and left hand branches 117 and 119. Further, the branch 119 may be lengthened by a quarter wavelength to impart an additional −90° phase shift in the branch to thereby result in a phase relationship similar to the arrangement described in FIG. 1. As shown in FIG. 4A and FIG. 4B, the transceiver 100 may be located with its center 118 at the focus F of a parabolic reflector 120 and supported by struts 124 in the manner similar to the arrangement illustrated in the above-identified related patent application. The transceiver 100 and the supports 124 are sized so as to provide minimum structural interference with the reflector 120 for maximum or optimal transmission and reception.

In operation, the switches 18, 19, 32 and 33 (FIG. 1) and 104 (FIG. 3) are sequenced for sum and azimuth of or the other sense of polarization sense or sum and elevation in or the other polarization sense. The polarization diversity allows optimal information to be received from a target.

Figure 5:
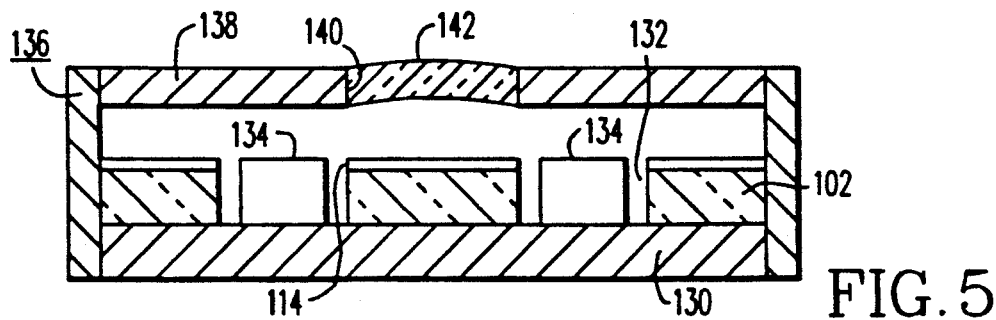
FIG. 5 is a schematic side sectional illustration of the transceiver of FIG. 2 supported in a housing.

In the arrangement illustrated in FIG. 5 the substrate 102 is mounted to a thermal expansion matched ground plane 130. Cut outs 132 may be provided in the substrate 102 to accommodate MMIC circuits 134. A housing 136 may be provided to support the substrate 102. The housing 136 may be formed with an apertured cover 138 with a window 140 and focusing lens 142 located in the window and aligned with the antenna elements 114.

It should be understood that various alternative embodiments may be provided. For example, a Lange coupler may be employed instead of the branch line coupler 22 (FIG. 1). It is also possible to provide almost square antenna elements (not shown) fed from the corners which produce right hand or left hand polarization depending upon the feed direction.

While there has been described what at present is believed to be the preferred embodiment of the present invention, it will be apparent to those skilled in the art the various changes and notifications may made therein without departing from the invention, and is intended in the appended claims to cover all such modifications and changes that come within true spirit and scope of the invention.

What is claimed is:

1. A planar millimeter wave transceiver comprising:
   a substrate;
   a plurality of antenna elements disposed on the substrate in right and left circularly polarized configuration;
   feed means interconnecting adjacent antenna elements and having a feed point therebetween;
   first switch means interconnected with the feed points of the feed means coupled to adjacent pairs of antenna elements alternately operable between first and second conditions for establishing azimuth and elevation configurations of the antenna elements;
   a sum channel and a difference channel; and
   second switch means interconnected with the sum and difference channels, with the first switch means alternately operable between first and second conditions for establishing transmit and receive modes for the antenna elements, said feed means, said sum and difference channels and said first and second switch means being interconnected without crossovers on the substrate.

2. A planar millimeter wave transceiver comprising:
   a substrate;
   antenna means disposed on the substrate;
   feed means interconnecting the antenna means;
   first switch means interconnecting feed means in pairs, said first switch means alternately operable between first and second conditions for establishing azimuth and elevation configurations of the antenna means;
   second switch means interconnected with the first switch means alternately operable between first and second conditions for establishing transmit and receive modes for the antenna means, said feed means, and said first and second switch means being interconnected without crossovers on the substrate; and
   a sum channel and a difference channel interconnecting the first and second switch means and the antenna means.

3. The transceiver of claim 2 wherein the antenna means comprises a plurality of patch antenna elements disposed on the substrate.

4. The transceiver of claim 3 wherein the antenna elements are formed of a metallized film on the substrate each formed with a slot therein.

5. The transceiver of claim 4 wherein the antenna elements are symmetrically disposed about a center in right hand and left hand polarization sense.

6. The transceiver of claim 5 wherein the antenna elements comprise four elements arranged in a 2×2 configuration.

7. The transceiver of claim 6 wherein the feed means comprises four antenna feeds one each interconnecting adjacent antenna elements.

8. The transceiver of claim 7 wherein the first switch means comprises a pair of switches each having two operable states coupled to an adjacent pair of antenna feeds.

9. The transceiver of claim 8 wherein the first switch means includes one pole for each operable state alternately coupled to an adjacent pair of antenna feeds to open one adjacent feed and close the other in each of said two operable states.

10. The transceiver of claim 9 wherein the feed means have line lengths in odd multiples of quarter wavelengths of millimeter wave signals centered at a selected center frequency operative for isolating the interconnected antenna elements.

11. The transceiver of claim 3 wherein the feed means are formed of microstrips having line lengths in odd multiples of quarter wavelengths of millimeter wave signals centered at a selected frequency.

12. The transceiver of claim 9 wherein the feed means include feed points disposed along transverse axes and the slots are inclined relative to the axes in respective left hand and right hand polarization senses.

13. The transceiver of claim 12 wherein the feed means comprise a plurality of microstrips one each interconnecting the feed point of the antenna feed with a pole of the first switch means.

14. The transceiver of claim 9 wherein the feed means include lengths of microstrip lines coupled between portions of the antenna elements and the first switch means for isolating the antenna elements with a short and producing an open circuit at the antenna with an open pole of the first switch means when the first switch means is open circuit with respect to the antenna means.

15. The transceiver of claim 2 further including mixer means on the substrate responsive for mixing a LO signal and a received signal from the antenna means and producing an IF signal.

16. The transceiver of claim 2 wherein the second switch means comprises a pair of switches each having two operable states for transmit and receive modes, one each of the switches coupled to sum and difference channels and being alternately opened and closed to transmit and receive.

17. The transceiver of claim 16 wherein the second switch means is interconnected between the mixer means and the antenna.

18. The transceiver of claim 2 further including coupler means for coupling the antenna means.

19. The transceiver of claim 18 further including phase shifting means for a selected portion of the antenna means, the phase shifting means being interconnected between the coupler means and the first switch means.

20. The transceiver of claim 2 wherein the second switch means comprises a pair of switches for establishing a pair of channels responsive to carry transmit and receive signals to selected portions of the antenna means.

21. The transceiver of claim 2 further including phase shifting means in the sum and difference channels for establishing a first phase shift between said channels.

22. The transceiver of claim 21 wherein the feed means includes a feed for each channel feeding the antenna means in opposite directions for establishing a phase reversal between the channels.

23. The transceiver of claim 2 further including transmitter and receiver means located on the substrate coupled to the second switch means.

24. The transceiver of claim 23 wherein the receiver means comprises amplified mixer means coupled to a local oscillator and the second switch means for establishing an intermediate frequency signal.

25. The transceiver of claim 24 wherein the first and second switch means and the transmitter and receiver means are formed from MMIC elements.

26. The transceiver of claim 25 further comprising a housing for the substrate having an apertured window therein in alignment with the antenna means and wherein the substrate has apertures therein for receiving the MMIC elements therein.

27. The transceiver of claim 26 further comprising lens means in the window for focusing millimeter wave signals transmitted and received by the antenna means.

* * * * *